United States Patent
Jain et al.

(10) Patent No.: US 9,794,263 B2
(45) Date of Patent: Oct. 17, 2017

(54) TECHNOLOGIES FOR ACCESS CONTROL

(71) Applicant: Intel Corporation, Santa Clara, CA (US)

(72) Inventors: Sanjeev Jain, Chandler, AZ (US); Ronen Chayat, Haifa (IL)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 14/583,638

(22) Filed: Dec. 27, 2014

(65) Prior Publication Data

US 2016/0191530 A1 Jun. 30, 2016

(51) Int. Cl.
*G06F 15/16* (2006.01)
*H04L 29/06* (2006.01)
*H04L 12/741* (2013.01)

(52) U.S. Cl.
CPC ............ *H04L 63/101* (2013.01); *H04L 45/74* (2013.01); *H04L 63/20* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 6,507,592 B1 * | 1/2003 | Hurvig | ................ | H04L 12/2801 370/503 |
| 8,090,805 B1 * | 1/2012 | Chawla | .................. | H04L 12/00 709/221 |
| 8,619,579 B1 * | 12/2013 | Rothstein | .............. | H04L 43/026 370/235 |
| 2002/0152209 A1 * | 10/2002 | Merugu | .................. | H04L 47/10 |
| 2004/0190526 A1 * | 9/2004 | Kumar | .................. | H04L 45/302 370/395.21 |
| 2008/0013830 A1 * | 1/2008 | Patterson | ............ | G06F 11/1451 382/173 |
| 2013/0336329 A1 * | 12/2013 | Gopinath | ................ | H04L 45/24 370/401 |

OTHER PUBLICATIONS

"Content-addressable memory", downloaded from http://en.wikipedia.org/wiki/Content-addressable_memory, retrieved Sep. 17, 2014.
"Cyclic redundancy check", downloaded from http://en.wikipedia.org/wiki/Cyclic_redundancy_check, retrieved Sep. 17, 2014.

* cited by examiner

*Primary Examiner* — Fatoumata Traore
(74) *Attorney, Agent, or Firm* — Barnes & Thornburg LLP

(57) ABSTRACT

Technologies for performing access control include a computing device that parses a network packet received by the computing device to identify an n-tuple of a header of the network packet, wherein the n-tuple is associated with one or more access control rules. The computing devices determines a bitmask associated with an access control rule of a virtual machine of the computing device and applies the determined bitmask to the n-tuple of the network packet to generate a masked n-tuple. Further, the computing device generates a hash of the masked n-tuple and compares the generated hash to a reference hash associated with the access control rule to identify a match. The computing device performs an access control action in response to identifying a match between the generated hash and the reference hash.

19 Claims, 6 Drawing Sheets

TECHNOLOGIES FOR ACCESS CONTROL

BACKGROUND

Access control lists (ACLs) are often used in networking systems to control various networking functions of a computing device. For example, a computing device may utilize an access control list to determine how an inbound network packet (e.g., from a remote device or a virtual machine switch) should be processed and/or how outbound network traffic should be handled. Further, in some circumstances, ACLs are implemented in hardware using, for example, on-die ternary lookup resources such as ternary content-addressable memory (TCAM) in order to perform lookup functions very quickly.

Including enough TCAM resources and/or other hardware lookup resources in a particular chipset to handle a very large number of ternary rules may be considered very expensive in terms of hardware cost and/or power consumption. For example, in some embodiments, a large number of virtual machines (e.g., 64-256 virtual machines) that each includes a different set of ACL rules may be utilized for access control in which case a considerable amount of TCAM (e.g., 4 MB) may be required. Although software-implemented ACL solutions may be employed for access control, they generally suffer from slower processing rates or otherwise poor performance, which may be unacceptable for many applications.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
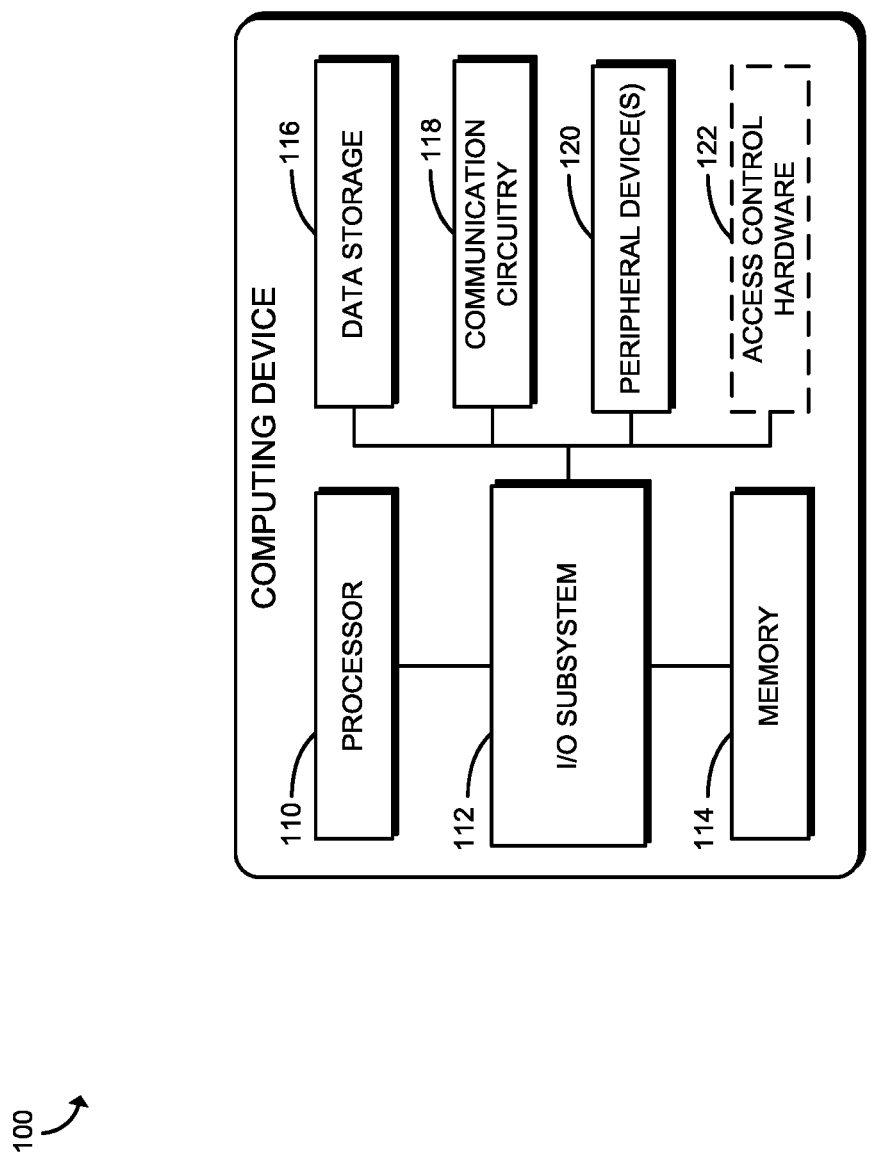
FIG. 1 is a simplified block diagram of at least one embodiment of a computing device for access control.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for access control is shown. As described in detail below, the computing device 100 parses a received network packet (e.g., from a remote computing device or a VM-VM switch) in order to identify an n-tuple of the header of the network packet. For example, in the illustrative embodiment, the computing device 100 identifies the 5-tuple that includes a source internet protocol address, a destination internet protocol address, a source port, a destination port, and a protocol associated with the network packet. The computing device 100 determines a bitmask associated with an access control rule of a virtual machine (e.g., the virtual machine that received the network packet) and applies the determined bitmask to the identified n-tuple to generate a masked n-tuple. Further, the computing device 100 generates a hash of the masked n-tuple and compares the generated hash to a reference hash associated with the access control rule to determine whether there is a match. It should be appreciated that, if there is a match, there is a probabilistic or likely match between the access control rule and the 5-tuple (or more generally between the rule and the packet). Accordingly, the computing device 100 may perform a deterministic comparison to determine whether the access control rule applies to the network packet. As described herein, it should be appreciated that the computing device 100 may similarly compare the 5-tuple of the network packet to multiple other access control rules in parallel. For example, in some embodiments, the 5-tuple may be compared to 256 rules at a time. Further, in the illustrative embodiment, the functions associated with the probabilistic comparison are performed in hardware (e.g., with memory and logic gates), whereas the deterministic comparison is performed by software.

The computing device 100 may be embodied as any type of computing device capable of performing the functions described herein. For example, the computing device 100 may be embodied as a server, desktop computer, router, switch, laptop computer, tablet computer, notebook, netbook, Ultrabook™, cellular phone, smartphone, wearable computing device, personal digital assistant, mobile Internet device, Hybrid device, and/or any other computing/communication device. As shown in FIG. 1, the illustrative computing device 100 includes a processor 110, an input/output ("I/O") subsystem 112, a memory 114, a data storage 116, a communication circuitry 118, and one or more peripheral devices 120. Additionally, in some embodiments, the computing device 100 may also include access control hardware 122. Of course, the computing device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the computing device 100 useful for performing the functions described herein. For example, the computing device 100 may store an access control database, access control rule hashes, access control rule masks, and/or other suitable data as described herein.

The communication circuitry 118 may be embodied as any communication circuit, device, or collection thereof, capable of enabling communications between the computing device 100 and other remote devices over a network. The communication circuitry 118 may be configured to use any one or more communication technologies (e.g., wireless or wired communications) and associated protocols (e.g., Ethernet, Bluetooth®, Wi-Fi®, WiMAX, etc.) to effect such communication.

The peripheral devices 120 may include any number of additional peripheral or interface devices, such as speakers, microphones, additional storage devices, and so forth. The particular devices included in the peripheral devices 120 may depend on, for example, the type and/or intended use of the computing device 100.

The access control hardware 122 may be embodied as any hardware component(s) and/or circuitry capable of performing one or more of the functions described herein. For example, in some embodiments, the access control operations described herein may be offloaded (e.g., from the processor 110 and/or the communication circuitry 118) to an independent access control hardware 122. As such, the access control hardware 122 may include memory and logic gates to effect such operations.

Figure 2:
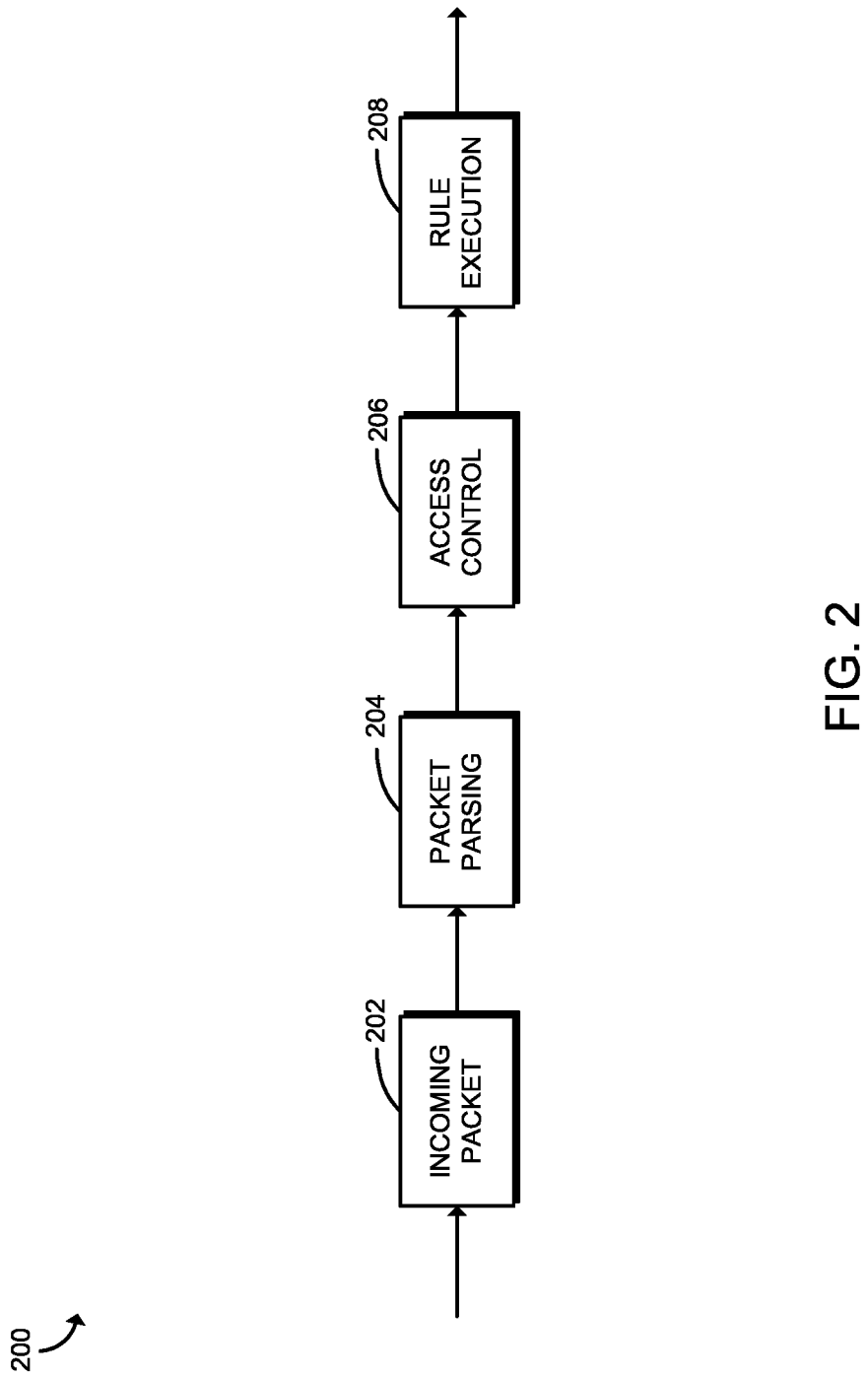
FIG. 2 is a simplified block diagram of at least one embodiment of a packet processing pipeline for access control.

Referring now to FIG. 2, the computing device 100 may handle access control operations by executing a packet processing pipeline 200 (or other packet processing pipeline including access control). As shown, the packet processing pipeline 200 illustrates an incoming packet 202, packet parsing 204, access control 206, and rule execution 208. The incoming packet 202 may be received from a remote computing device (e.g., over a network) or from a different component of the computing device 100. For example, in some embodiments, the incoming packet 202 may be received from an internal virtual machine due to virtual machine switching. The packet parsing 204 stage reads the fields of the incoming packet 202 (e.g., from the packet header) and parses the fields in order to identify a particular n-tuple against which one or more access control rules are to be compared. As discussed herein, in the illustrative embodiment, the computing device 100 identifies a 5-tuple of the packet header including the source internet protocol address, the destination internet protocol address, the source port, the destination port, and the protocol associated with the network packet. However, it should be appreciated that the computing device 100 may identify a different number of fields and/or different fields in identifying the n-tuple. For example, if a particular access control rule requires a comparison to a different header field than those described herein, that field may be included as a part of the n-tuple. The access control 206 stage determines whether a particular access control rule applies to a network packet as described herein. The rule execution 208 stage executes one or more actions associated with an access control rule in response to identifying a probabilistic and/or deterministic match between the network packet and the rule. Of course, in other embodiments, other processing pipelines, and structures thereof, may be used.

Figure 3:
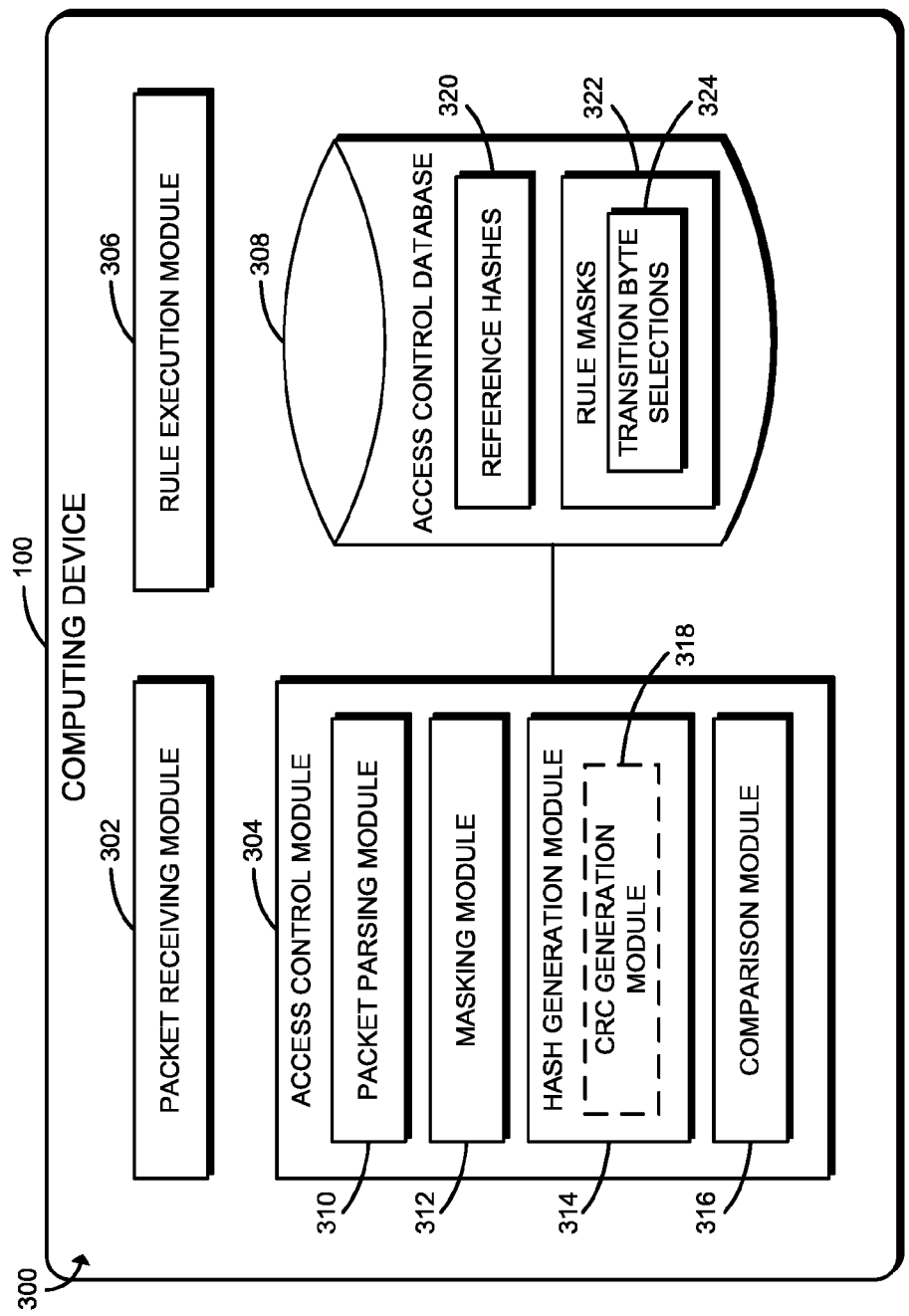
FIG. 3 is a simplified block diagram of at least one embodiment of an environment of the computing device of FIG. 1.

Referring now to FIG. 3, in use, the computing device 100 establishes an environment 300 for access control. The illustrative environment 300 of the computing device 100 includes a packet receiving module 302, an access control module 304, a rule execution module 306, and an access control database 308. Additionally, the access control module 304 includes a packet parsing module 310, a masking module 312, a hash generation module 314 (e.g., a CRC generation module 318), and a comparison module 316. The various modules of the environment 300 may be embodied as hardware, software, firmware, or a combination thereof. For example, the various modules, logic, and other components of the environment 300 may form a portion of, or otherwise be established by, the processor 110 or other hardware components of the computing device 100. As such, in some embodiments, one or more of the modules of the environment 300 may be embodied as a circuit or collection of electrical devices (e.g., a packet receiving circuit, an access control circuit, a rule execution circuit, a packet parsing circuit, a masking circuit, a hash generation circuit, a comparison circuit, and/or a CRC generation circuit). Additionally, in some embodiments, one or more of the illustrative modules may form a portion of another module and/or one or more of the illustrative modules may be embodied as a standalone or independent module.

The packet receiving module 302 handles the incoming network packets bound for access control analysis. As discussed above, in some embodiments, the incoming network packets may be, for example, network packets from a remote computing device, whereas in other embodiments, the network packets may be received from a VM-VM switch or component of the computing device 100. Accordingly, in some embodiments, the packet receiving module 302 is configured to handle the communication between the computing device 100 and remote computing devices (e.g., via a network).

The access control module 304 is configured to handle access control for network packets received by the computing device 100 (e.g., from an internal and/or external source). For example, in some embodiments, the access control module 304 probabilistically determines which access control rules apply to a particular network packet. As described above, the illustrative access control module 304 includes a packet parsing module 310, a masking module 312, a hash generation module 314, and a comparison module 316.

The packet parsing module 310 reads network packets forwarded from the packet receiving module 302 and identifies an n-tuple of the received network packets (e.g., from fields of the packet header). For example, in the illustrative embodiment, the packet parsing module 310 may identify a 5-tuple of a network packet header that consists of the source and destination IP addresses, the source and destination ports, and the protocol of the network packet.

The masking module 312 is configured to determine a bitmask associated with a particular access control rule and apply the bitmask to the parsed/identified n-tuple (e.g., the 5-tuple) to generate a masked n-tuple. For example, in one embodiment, a particular access control rule may only apply to a network packet if the network packet is directed to a destination port within a certain range. In such an embodiment, the masking module 312 may generate/determine a bitmask that suppresses/masks the other fields of the n-tuple (e.g., the source/destination IPs, the source port, and the protocol for the 5-tuple of the illustrative embodiment). In the illustrative embodiment, the masking module 312 assigns a value of zero to each bit that is masked; however, the masking module 312 may generate and/or apply a bitmask in any suitable manner in other embodiments (e.g., by assigning a bit value of one to masked bits). It should be appreciated that there may be a different set of access control rules, and therefore a different set of bitmasks, for each virtual machine of the computing device 100.

As described in further detail below, the masking module 312 may determine byte-level and/or bit-level masks depending on the particular access control rule. For example, in some embodiments, access control rules that require masks of a subnet of the source or destination IP address may require bit-level masks as the subnet boundary may not fall on a byte boundary (e.g., it may fall on a bit boundary). As shown, the access control database 308 may include a plurality of rules masks 322, which may include transition byte selections 324. It should be appreciated that each of the rule masks 322 identify a bitmask associated with a particular access control rule. Further, in embodiments in which intra-byte (i.e., bit-level) masks are necessary, a particular rule mask 322 may include one or more transition byte selections 324 that identify the bits masked in one or more bytes.

The hash generation module 314 is configured to generate a hash of the masked n-tuple generated by the masking module 312. It should be appreciated that the hash may be generated based on any suitable hash algorithm. Further, in some embodiments, the hash generation module 314 may compute a running hash. For example, in some embodiments, the hash generation module 314 includes a cyclic redundancy check (CRC) generation module 318 to generate a CRC hash of the masked n-tuple.

The comparison module 316 is configured to compare the generated hash of an n-tuple to a reference hash 320 corresponding with the same access control rule to determine whether there is a match. As such, in the illustrative embodiment, the access control database 308 includes a reference hash 320 for each access control rule. Further, although the hash of the masked n-tuple may be generated (by the hash generation module 314) based on any suitable hash algorithm, it should be appreciated that the hash is generated based on the same hash algorithm and that used to generate the corresponding reference hash 320. In the illustrative embodiment, the hash function/algorithm may result in collisions from different inputs in which case a match between the generated hash and the corresponding reference hash 320 is only probabilistic (i.e., likely indicative of a true match). Accordingly, in some embodiments, the comparison module 316 and/or another component of the computing device 100 may perform a deterministic comparison (e.g., in software) between the access control rule and the 5-tuple to determine whether the access control rule applies to the network packet. Of course, in some embodiments, the deterministic match may involve comparing a particular parameter to a range (e.g., a port range) rather than a single parameter value (e.g., a particular port value).

The rule execution module 306 is configured to perform one or more access control actions in response to the comparison module 316 identifying a match between the generated hash of the masked n-tuple and the corresponding reference hash 320 for that access control rule. For example, in some embodiments, the rule execution module 306 may instruct the comparison module 316 or another component of the computing device 100 to perform a deterministic comparison (e.g., against a particular value or range of values of one or more fields). In doing so, the rule execution module 306 may determine the access control rule associated with a matching reference hash 322 and pass the index of the matching rule (e.g., to the processor 110). As described herein, in some embodiments, the probabilistic match is performed in hardware and the deterministic match is performed in software. In other embodiments, the rule execution module 306 may determine to pass or drop the network packet based on the results of the probabilistic match. For example, in some embodiments, the rule execution module 306 may drop packets that do not match any reference hashes 320 and pass the indices for the rules corresponding with matching reference hashes 320.

Figure 4:
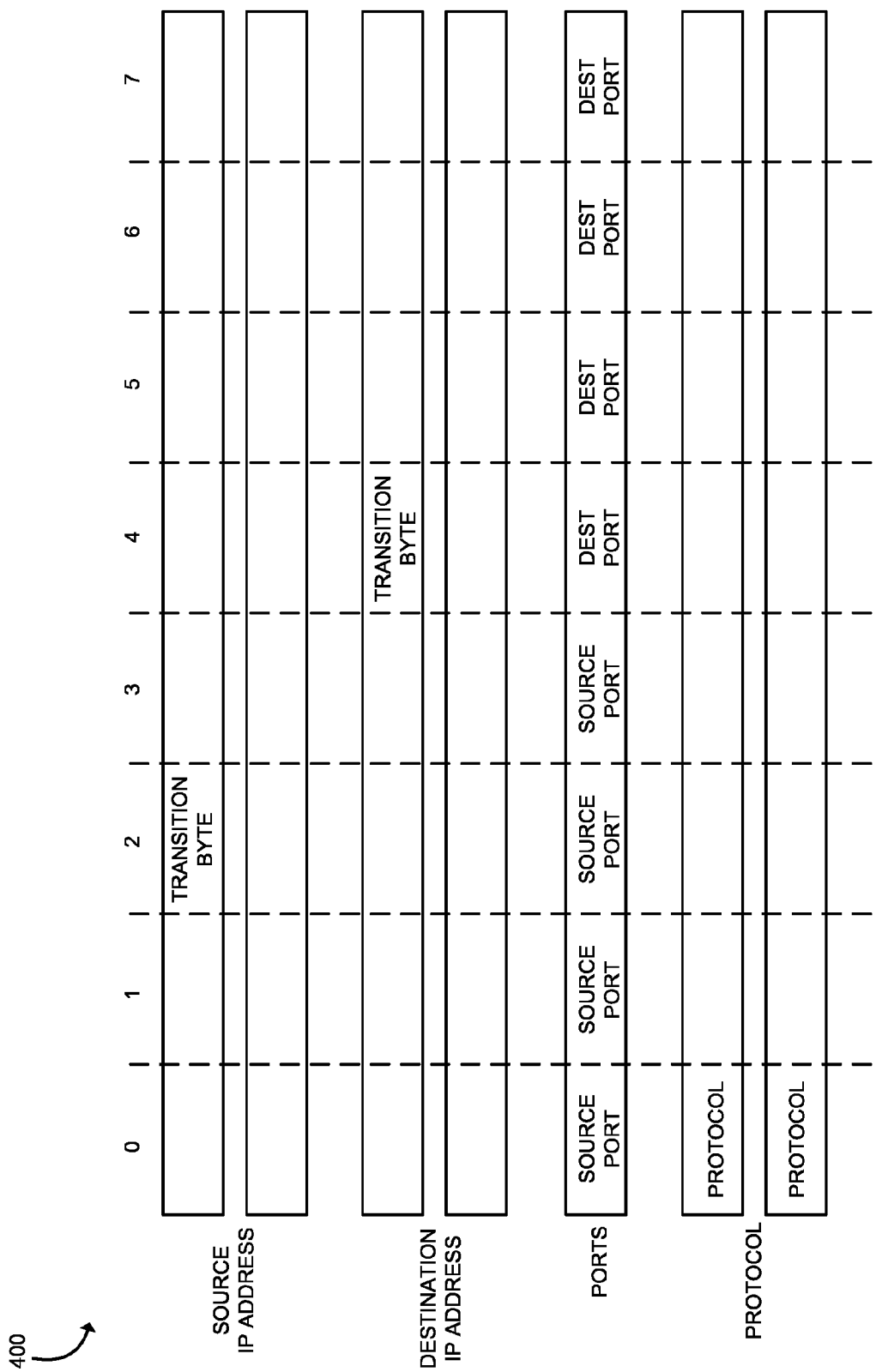
FIG. 4 is a simplified diagram of at least one embodiment of an access control 5-tuple data structure.

Referring now to FIG. 4, an access control 5-tuple data structure 400 is shown. In the illustrative embodiment, each of the rows of the data structure 400 is eight bytes such that 56 bytes are shown in the illustrative 5-tuple. More specifically, the data structure 400 includes a 16-byte source IP address field, a 16-byte destination IP address field, a 4-byte source port field, a 4-byte destination port field, and an up to 16-byte protocol field (although only the first byte of each row is specifically identified as such). As described herein, each of the source IP address field and the destination IP address field may include a transition byte. In the illustrative embodiment, the transition byte is indicative of a byte within which the boundary of the subnet ID of the corresponding IP address occurs. That is, in some embodiments, the subnet ID boundary exists within a particular byte at the bit-level, so the transition byte may be masked at the bit-level to account for access control rules that consider the subnet ID but not the data of the IP address on the other side of that boundary (or vice-versa). Of course, in other embodiments, one or more transition bytes may be utilized for any suitable reason.

It should be appreciated that the bitmasks may be structured and/or represented in a manner similar to that of the data structure 400. As shown, the source port of the illustrative data structure 400 is represented by the first four bytes of the fifth row of bytes. In some embodiments, the first and second byte of the source port field represent an exact or byte level mask associated with the source port, the third byte represents a fixed port range, and the fourth byte represents a user-defined port range. Similarly, the first and second byte of the destination port field represent an exact or byte level mask associated with the destination port, the third byte represents a fixed port range, and the fourth byte represents a user-defined port range. Of course, in some embodiments, ranges may be defined over fields/parameters other than the source and destination ports. As such, user-defined ranges, for example, may be utilized for other packet fields in other embodiments.

It should be appreciated that the source/destination IP, source/destination port, and/or protocol may be represented in any suitable way and include any data suitable for performing the functions described herein. For example, the IP address may be 32-bit for IPv4 or 128-bit for IPv6. Further, in various embodiments, the source and/or destination IP address may be represented in a bitmask by a complete IP address without a wild card, an IP address with a wild card on one or more bytes of the address, a network address in which a certain number of the most significant bits are relevant and denoted by a network prefix, or any IP address (in which case all of the bytes may be zeroed and/or otherwise ignored in an access control rule check). Similarly, the source and/or destination ports may be represented by a completed 16-bit port number, an arbitrary, user-defined, and/or well-known port range, or any port. The protocol may be represented as a fixed protocol type or any protocol type. Of course, in some embodiments, the n-tuple and the corresponding bitmask may include various other fields (e.g., source physical port, source logical port, source/destination MAC, payload type, VLAN identifier, VM identifier, user identifier, differentiated services code point, etc.). Further, in some embodiments, there may be predefined ranges (e.g., 32 ranges) for source and destination ports and additional ranges (e.g., 16 ranges) for source and destination ports loaded "on the fly" (e.g., VM port ranges may be loaded from SRAM "on the fly" for iterative comparisons). Of course, as described herein, various ranges may be utilized to identify and/or compare other fields of the network packets in some embodiments.

Figure 5:
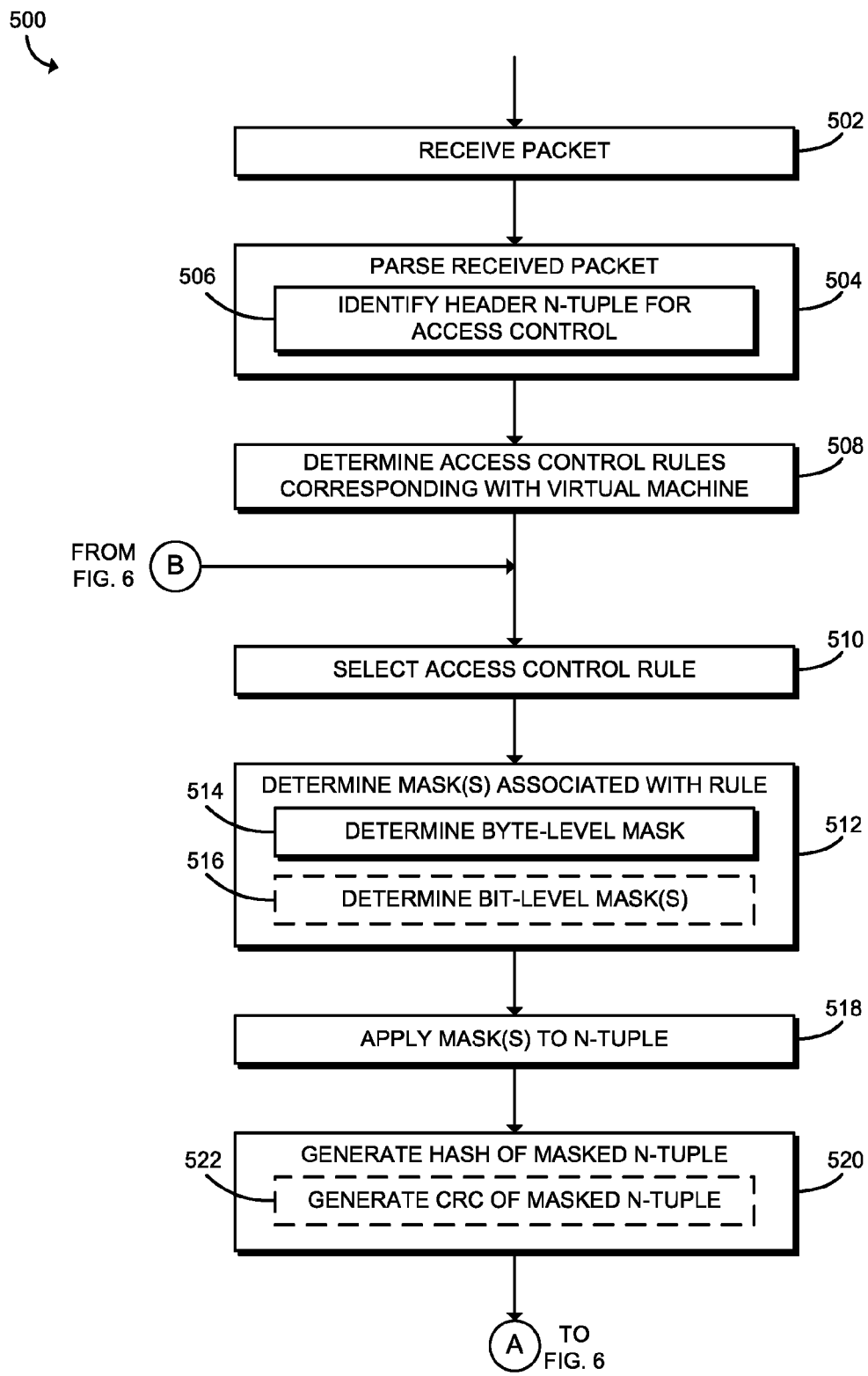
FIGS. 5-6 is a simplified flow diagram of at least one embodiment of a method for access control that may be executed by the computing device of FIG. 1.
Figure 6:
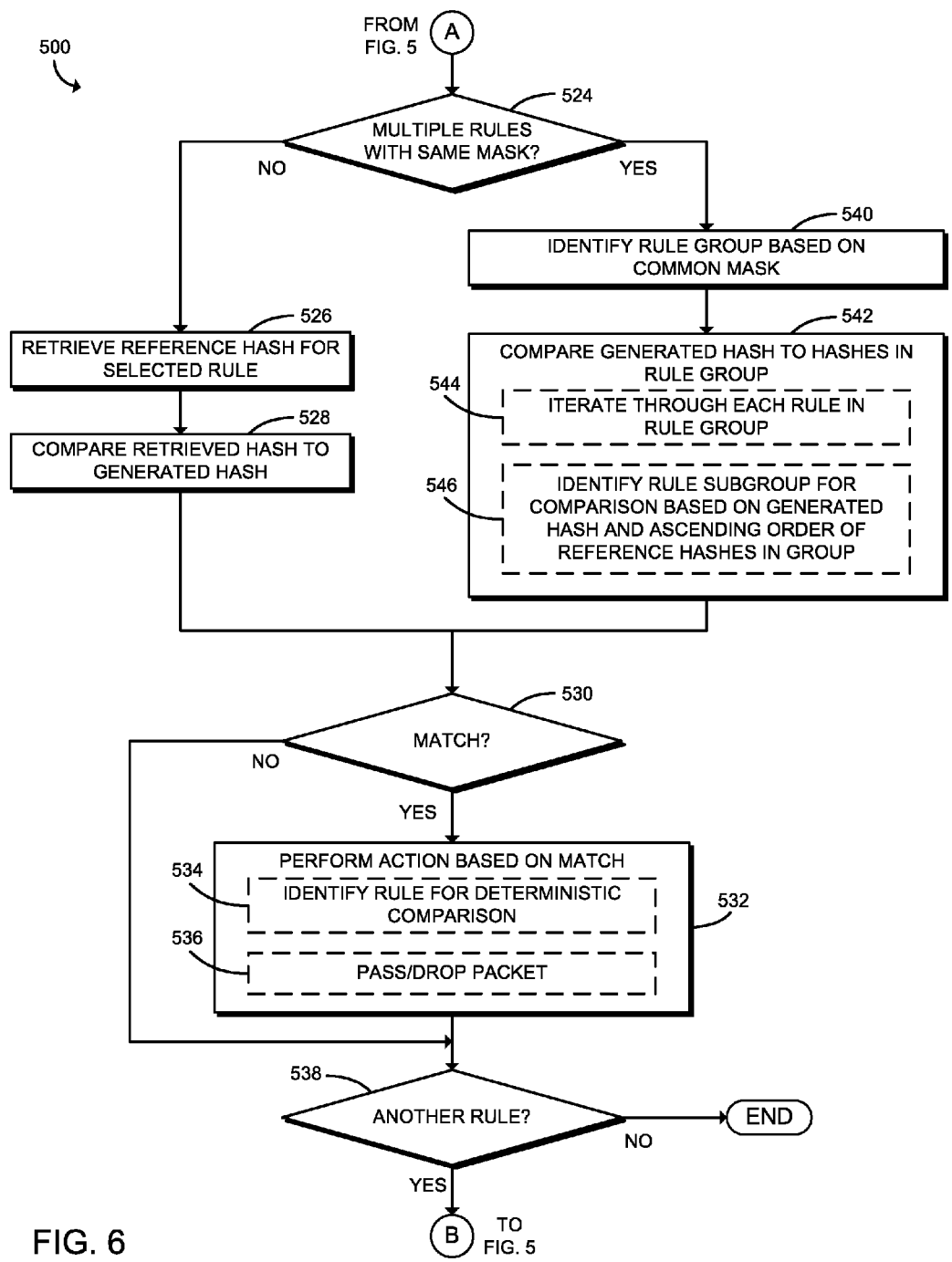

Referring now to FIGS. 5-6, the computing device 100 may execute a method 500 for access control during operation. As described herein, it should be appreciated that blocks 510-546 of the method 500 may be executed in parallel for the same network packet. In other words, in some embodiments, the computing device 100 may execute the method 500 on the same network packet for multiple access control rules in parallel. The illustrative method 500 begins with block 502 of FIG. 5 in which the computing device 100 receives a network packet. As described above, depending on the particular embodiment, the computing device 100 may receive the packet from a remote computing device, another component of the computing device, or another VM of the computing device.

In block 504, the computing device 100 parses the received network packet. In doing so, in block 506, the computing device 100 identifies an n-tuple of the header of the network packet for access control. In some embodiments, each of the access control rules includes one or more parameters to be compared to the network packet in order to determine whether that particular access control rule applies to the network packet. It should be appreciated that those parameters may dictate the particular n parameters included in the n-tuple. For example, in the illustrative embodiment, the computing device 100 determines whether each of the access control rules applies to a particular network packet based on the source/destination IP address, the source/destination ports, and/or the protocol of the 5-tuple of the network packet. For example, one rule may apply to network packets having a given destination IP address and a given destination port in which case the source IP address, source port, and protocol may be masked.

In block 508, the computing device 100 determines the access control rules corresponding with the virtual machine of the computing device 100 that received the network packet. In other words, in the illustrative embodiment, each of the virtual machines of the computing device 100 may include a different set of access control rules (and therefore different hashes 320 and masks 322). Accordingly, rather than loading all possible access control rules, the computing device 100 may load only the access control rules relevant to a particular virtual machine in some embodiments.

In block 510, the computing device 100 selects an access control rule from the list of access control rules relevant to the particular virtual machine. As discussed above, in some embodiments, the computing device 100 performs the functions described herein for a network packet and multiple access control rules simultaneously (e.g., in parallel). In block 512, the computing device 100 determines the bitmask(s) associated with the selected access control rule. In doing so, the computing device 100 determines a byte-level mask in block 514. For example, the computing device 100 may determine which of the bytes of the data structure 400 are to be masked based on the rule mask 322 associated with the access control rule. Further, in block 516, the computing device 100 may determine a bit-level mask in some embodiments. More specifically, the computing device 100 may determine one or more transition byte selections 324 associated with the access control rule (see, e.g., the transition bytes of FIG. 4). In some embodiments, a particular transition byte selection 324 may be represented by one byte (i.e., eight bits) in which five of the bits identify the specific byte of the source/destination IP address for which there is a bit-level mask (e.g., for a subnet ID) and the remaining three bits identify a bit within the identified byte at which the mask begins (or ends in other embodiments). It should be appreciated that five bits is sufficient for the selection of any of the 32 bytes that constitute the IP addresses in the data structure 400 and three bits allow for the selection of any of the 8 bits in the byte. In some embodiments, a particular access control rule may have a rule mask 322 that includes multiple transition byte selections 324 in order to provide multiple bit-level masks. It should be appreciated that, in the illustrative embodiment, each of the access control rules includes one or more predefined rule masks 322 based on the relevant parameters of the network packet (e.g., IP address, port, etc.).

In block 518, the computing device 100 applies the identified rule mask(s) 322 to the n-tuple (e.g., the 5-tuple) to generate a masked n-tuple. In some embodiments, in doing so, the computing device 100 sets each of the bits (of the n-tuple) identified in the rule mask(s) 322 to zero. However, in other embodiments, the computing device 100 may set each of those bits to one. In other words, the computing device 100 may perform a bitwise "and" operation on the mask 322 and the n-tuple to generate a masked n-tuple. In yet another embodiment, the computing device 100 may ignore the masked bits for subsequent operations (e.g., hash generation).

In block 520, the computing device 100 generates a hash of the masked n-tuple. As discussed above, it should be appreciated that the computing device 100 utilizes the same hash algorithm/function as that used to generate the corresponding reference hash 320 for the selected access control rule. In some embodiments, in block 522, the computing device 100 may generate the hash based on a cyclic redundancy check (CRC) hash algorithm. As such, in some embodiments, the computing device 100 may compute the hash of the masked n-tuple over multiple cycles (e.g., using pipeline-based operation) and the features described herein may be modified accordingly.

In block 524 of FIG. 6, the computing device 100 determines whether multiple access control rules include the same rule mask(s) 322 as that identified for the selected access control rule. If not, in block 526, the computing device 100 retrieves the reference hash 320 (e.g., from the access control database 308) for the selected access control rule. In block 528, the computing device 100 compares the retrieved reference hash 320 to the generated hash of the n-tuple. In block 530, the computing device 100 determines whether there is a probabilistic match between the rule and the packet. If so, in block 532, the computing device 100 performs one or more access control actions in some embodiments. For example, in block 534, the computing device 100 may identify the access control rule (e.g., the rule index) and/or one or more parameters of the network packet for a deterministic comparison (e.g., by a software module of the computing device 100). It should be appreciated that, in some embodiments, software is only used to perform the deterministic comparison and hardware is used to perform the other functions described herein in order to improve efficiency. In block 536, the computing device 100 may pass or drop the packet based whether or not there was a probabilistic match as described above. Further, the computing device 100 may perform various other access control actions based on a policy associated with an access control rule (e.g., in response to a probabilistic and/or deterministic match/miss) depending on the particular embodiment. For example, the computing device 100 may redirect the packet to another destination, mirror the packet, meter the packet, and/or perform another suitable access control action based on a corresponding rule policy.

In block 538, the computing device 100 determines whether to select another access control rule (e.g., from the list of access control rules for the particular VM) to determine whether than access control rule applies to the network packet. If so, the method 500 returns to block 510 of FIG. 5 in which the computing device 100 selects another access control rule. Otherwise, the method 500 terminates. As described above, it should be appreciated that, in some embodiments, the computing device 100 may perform probabilistic comparisons of multiple rules to a particular network packet in parallel. For example, in some embodiments, 256 access control rules may be handled in simultaneously. Further, in some embodiments in which a CRC hash is used, the access control functions described herein may be performed on eight bytes of input data per cycle. For example, the computing device 100 may retrieve the input data and apply the masks in the first cycle, apply a CRC hash to the four most significant bytes and another CRC hash to the four least significant bytes in the second cycle, and generate a combined CRC hash based on those generated CRC hashes in the third cycle. As such, it may take seven cycles to pass through 56 bytes of data and eight cycles to pass through 64 bytes of data.

Returning to block 524, if the computing device 100 determines that multiple access control rules share a common rule mask 322, the computing device 100 may consider multiple access control rules based on the same generated hash (e.g., to improve efficiency). In particular, in block 540, the computing device 100 identifies a rule group based on the common mask. For example, in some embodiments, the access control rules may be organized such that access control rules having the same rule mask 322 belong to the same rule group. Accordingly, the rule group may be selected based on the rule mask 322. In some embodiments, the rule group includes a link (e.g., a pointer) to a list of reference hashes 320 for the included rules arranged in ascending (or descending) order.

In block 542, the computing device 100 compares the generated hash of the masked n-tuple to one or more hashes in the identified rule group. In doing so, in block 544, the computing device 100 may iterate through each access control rule in the rule group to determine whether there is a probabilistic match between the rule and the network packet in some embodiments. In other embodiments, in block 546, the computing device 100 may identify a rule subgroup of the rule group for comparison based on the generated hash and an ascending order of the reference hashes 320 in the group. For example, in some embodiments, the rule group includes a list of reference hashes 320 for the included rules arranged in ascending order. Further, in some embodiments, the rule group may be arranged into subgroups of seven entries bounded by other entries. In such embodiments, the computing device 100 may compare the generated hash to the first boundary (e.g., the eighth reference hash entry). If there is a match, the computing device 100 has identified the boundary entry as a probabilistic match. However, if the generated hash has a value between two boundaries, the computing device 100 may compare the generated hash to the reference hashes 320 that belong to the subgroup defined between those boundaries to determine whether there is a probabilistic match. In some embodiments, it should be appreciated that the generated hash may match multiple reference hashes 320 in which case multiple access control rules corresponding with those hashes 320 are probabilistic matches with the network packet. It should further be appreciated that, depending on the particular embodiment, the computing device 100 may utilize any suitable algorithm, technique, and/or mechanism to determine which reference hashes 320 are probabilistic matches to the hash of the masked n-tuple. Additionally, in some embodiments, the computing device 100 may utilize the same hardware (e.g., the same logic gates) to perform probabilistic comparisons for access control rules that have a common mask with other rules as the hardware used for access control rules that do not have a common mask with other rules.

EXAMPLES

Illustrative examples of the technologies disclosed herein are provided below. An embodiment of the technologies may include any one or more, and any combination of, the examples described below.

Example 1 includes a computing device for access control, the computing device comprising an access control module to (i) parse a network packet received by the computing device to identify an n-tuple of a header of the network packet, wherein the n-tuple is associated with one or more access control rules, (ii) determine a bitmask associated with an access control rule of a virtual machine of the computing device from the one or more access rules, (iii) apply the determined bitmask to the n-tuple of the network packet to generate a masked n-tuple, (iv) generate a hash of the masked n-tuple, and (v) compare the generated hash to a reference hash associated with the access control rule to identify a match; and a rule execution module to perform an access control action in response to identification of a match between the generated hash and the reference hash.

Example 2 includes the subject matter of Example 1, and wherein to determine the bitmask comprises to determine a byte-level bitmask.

Example 3 includes the subject matter of any of Examples 1 and 2, and wherein to determine the bitmask comprises to determine a bitmask of a portion of at least one of a source internet protocol address field, a destination internet protocol address field, a source port field, a destination port field, or a protocol field of the header of the network packet.

Example 4 includes the subject matter of any of Examples 1-3, and wherein to determine the bitmask comprises to determine a bit-level bitmask of a transition byte of at least one of the source internet protocol address field or the destination internet protocol address field, wherein the transition byte is associated with a subnet of the corresponding internet protocol address.

Example 5 includes the subject matter of any of Examples 1-4, and wherein to generate the hash comprises to generate a cyclic redundancy check (CRC) hash of the masked n-tuple.

Example 6 includes the subject matter of any of Examples 1-5, and wherein to generate the hash comprises to generate a running hash of the masked n-tuple.

Example 7 includes the subject matter of any of Examples 1-6, and wherein the access control module is further to determine whether multiple access control rules correspond with the determined bitmask; identify a rule group based on the determined bitmask, wherein the rule group consists of access control rules that correspond with the determined bitmask; and compare the generated hash to one or more references hashes of the rule group to identify a match.

Example 8 includes the subject matter of any of Examples 1-7, and wherein to compare the generated hash to the one or more reference hashes comprises to iterate through each access control rule of the rule group to identify a match.

Example 9 includes the subject matter of any of Examples 1-8, and wherein to compare the generated hash to the one or more reference hashes comprises to identify a rule sub-group of the rule group for comparison based on the generated hash and an ascending order of reference hashes in the rule group.

Example 10 includes the subject matter of any of Examples 1-9, and wherein to perform the access control action comprises to identify the access control rule for a deterministic comparison in response to identification of a match between the generated hash and the reference hash.

Example 11 includes the subject matter of any of Examples 1-10, and wherein to identify the n-tuple comprises to identify a 5-tuple consisting of a source internet protocol address field, a destination internet protocol address field, a source port field, a destination port field, and a protocol field.

Example 12 includes the subject matter of any of Examples 1-11, and wherein to parse the network packet comprises to parse a network packet received from a virtual machine switch.

Example 13 includes the subject matter of any of Examples 1-12, and wherein to parse the network packet comprises to parse a network packet received from a remote computing device communicatively coupled to the computing device.

Example 14 includes the subject matter of any of Examples 1-13, and wherein the access control module is further to determine a plurality of access control rules corresponding with a virtual machine of the computing device that received the network packet.

Example 15 includes the subject matter of any of Examples 1-14, and wherein the access control module is further to select the access control rule from the plurality of access control rules.

Example 16 includes the subject matter of any of Examples 1-15, and wherein to determine the bitmask, apply the determined bitmask, generate the hash, and compare the generated hash comprises to determine a bitmask, apply a determined bitmask, generate a hash, and compare the generated hash for a plurality of access control rules in parallel.

Example 17 includes a method for performing access control by a computing device, the method comprising parsing, by the computing device, a network packet received by the computing device to identify an n-tuple of a header of the network packet, wherein the n-tuple is associated with one or more access control rules; determining, by the computing device, a bitmask associated with an access control rule of a virtual machine of the computing device from the one or more access control rules; applying, by the computing device, the determined bitmask to the n-tuple of the network packet to generate a masked n-tuple; generating, by the computing device, a hash of the masked n-tuple; comparing, by the computing device, the generated hash to a reference hash associated with the access control rule to identify a match; and performing, by the computing device, an access control action in response to identifying a match between the generated hash and the reference hash.

Example 18 includes the subject matter of Example 17, and wherein determining the bitmask comprises determining a byte-level bitmask.

Example 19 includes the subject matter of any of Examples 17 and 18, and wherein determining the bitmask comprises determining a bitmask of a portion of at least one of a source internet protocol address field, a destination internet protocol address field, a source port field, a destination port field, or a protocol field of the header of the network packet.

Example 20 includes the subject matter of any of Examples 17-19, and wherein determining the bitmask comprises determining a bit-level bitmask of a transition byte of at least one of the source internet protocol address field or the destination internet protocol address field, wherein the transition byte is associated with a subnet of the corresponding internet protocol address.

Example 21 includes the subject matter of any of Examples 17-20, and wherein generating the hash comprises generating a cyclic redundancy check (CRC) hash of the masked n-tuple.

Example 22 includes the subject matter of any of Examples 17-21, and wherein generating the hash comprises generating a running hash of the masked n-tuple.

Example 23 includes the subject matter of any of Examples 17-22, and further including determining, by the computing device, whether multiple access control rules correspond with the determined bitmask; identifying, by the computing device, a rule group based on the determined bitmask, wherein the rule group consists of access control rules that correspond with the determined bitmask; and comparing, by the computing device, the generated hash to one or more references hashes of the rule group to identify a match.

Example 24 includes the subject matter of any of Examples 17-23, and wherein comparing the generated hash to the one or more reference hashes comprises iterating through each access control rule of the rule group to identify a match.

Example 25 includes the subject matter of any of Examples 17-24, and wherein comparing the generated hash to the one or more reference hashes comprises identifying a rule subgroup of the rule group for comparison based on the generated hash and an ascending order of reference hashes in the rule group.

Example 26 includes the subject matter of any of Examples 17-25, and wherein performing the access control action comprises identifying the access control rule for a deterministic comparison in response to identifying a match between the generated hash and the reference hash.

Example 27 includes the subject matter of any of Examples 17-26, and wherein identifying the n-tuple comprises identifying a 5-tuple consisting of a source internet protocol address field, a destination internet protocol address field, a source port field, a destination port field, and a protocol field.

Example 28 includes the subject matter of any of Examples 17-27, and wherein parsing the network packet comprises parsing a network packet received from a virtual machine switch.

Example 29 includes the subject matter of any of Examples 17-28, and wherein parsing the network packet comprises parsing a network packet received from a remote computing device communicatively coupled to the computing device.

Example 30 includes the subject matter of any of Examples 17-29, and further including determining, by the computing device, a plurality of access control rules corresponding with a virtual machine of the computing device that received the network packet.

Example 31 includes the subject matter of any of Examples 17-30, and further including selecting, by the computing device, the access control rule from the plurality of access control rules.

Example 32 includes the subject matter of any of Examples 17-31, and wherein determining the bitmask, applying the determined bitmask, generating the hash, and comparing the generated hash comprises determining a bitmask, applying a determined bitmask, generating a hash, and comparing the generated hash for a plurality of access control rules in parallel.

Example 33 includes a computing device comprising a processor; and a memory having stored therein a plurality of instructions that when executed by the processor cause the computing device to perform the method of any of Examples 17-32.

Example 34 includes one or more machine-readable storage media comprising a plurality of instructions stored thereon that, in response to execution by a computing device, cause the computing device to perform the method of any of Examples 17-32.

Example 35 includes a computing device for access control, the computing device comprising means for parsing a network packet received by the computing device to identify an n-tuple of a header of the network packet, wherein the n-tuple is associated with one or more access control rules; means for determining a bitmask associated with an access control rule of a virtual machine of the computing device from the one or more access control rules; means for applying the determined bitmask to the n-tuple of the network packet to generate a masked n-tuple; means for generating a hash of the masked n-tuple; means for comparing the generated hash to a reference hash associated with the access control rule to identify a match; and means for performing an access control action in response to identifying a match between the generated hash and the reference hash.

Example 36 includes the subject matter of Example 35, and wherein the means for determining the bitmask comprises means for determining a byte-level bitmask.

Example 37 includes the subject matter of any of Examples 35 and 36, and wherein the means for determining the bitmask comprises means for determining a bitmask of a portion of at least one of a source internet protocol address field, a destination internet protocol address field, a source port field, a destination port field, or a protocol field of the header of the network packet.

Example 38 includes the subject matter of any of Examples 35-37, and wherein the means for determining the bitmask comprises means for determining a bit-level bitmask of a transition byte of at least one of the source internet protocol address field or the destination internet protocol address field, wherein the transition byte is associated with a subnet of the corresponding internet protocol address.

Example 39 includes the subject matter of any of Examples 35-38, and wherein the means for generating the hash comprises means for generating a cyclic redundancy check (CRC) hash of the masked n-tuple.

Example 40 includes the subject matter of any of Examples 35-39, and wherein the means for generating the hash comprises means for generating a running hash of the masked n-tuple.

Example 41 includes the subject matter of any of Examples 35-40, and further including means for determining whether multiple access control rules correspond with the determined bitmask; means for identifying a rule group based on the determined bitmask, wherein the rule group consists of access control rules that correspond with the determined bitmask; and means for comparing the generated hash to one or more references hashes of the rule group to identify a match.

Example 42 includes the subject matter of any of Examples 35-41, and wherein the means for comparing the generated hash to the one or more reference hashes comprises means for iterating through each access control rule of the rule group to identify a match.

Example 43 includes the subject matter of any of Examples 35-42, and wherein the means for comparing the generated hash to the one or more reference hashes comprises means for identifying a rule subgroup of the rule group for comparison based on the generated hash and an ascending order of reference hashes in the rule group.

Example 44 includes the subject matter of any of Examples 35-43, and wherein the means for performing the access control action comprises means for identifying the access control rule for a deterministic comparison in response to identifying a match between the generated hash and the reference hash.

Example 45 includes the subject matter of any of Examples 35-44, and wherein the means for identifying the n-tuple comprises means for identifying a 5-tuple consisting of a source internet protocol address field, a destination internet protocol address field, a source port field, a destination port field, and a protocol field.

Example 46 includes the subject matter of any of Examples 35-45, and wherein the means for parsing the network packet comprises means for parsing a network packet received from a virtual machine switch.

Example 47 includes the subject matter of any of Examples 35-46, and wherein the means for parsing the network packet comprises means for parsing a network packet received from a remote computing device communicatively coupled to the computing device.

Example 48 includes the subject matter of any of Examples 35-47, and further including means for determining a plurality of access control rules that corresponds with a virtual machine of the computing device that received the network packet.

Example 49 includes the subject matter of any of Examples 35-48, and further including means for selecting the access control rule from the plurality of access control rules.

Example 50 includes the subject matter of any of Examples 35-49, and wherein the means for determining the bitmask, the means for applying the determined bitmask, the means for generating the hash, and the means for comparing the generated hash comprises means for determining a bitmask, means for applying a determined bitmask, means for generating a hash, and means for comparing the generated hash for a plurality of access control rules in parallel.

The invention claimed is:

1. A computing device for access control, the computing device comprising:
  an access control module to (i) parse a network packet received by the computing device to identify an n-tuple of a header of the network packet, wherein the n-tuple is associated with one or more access control rules, (ii) determine a bitmask associated with an access control rule of a virtual machine of the computing device from the one or more access rules, wherein the bitmask comprises a bit-level bitmask of a transition byte of at least one of a source internet protocol address field or the destination internet protocol address field of the header of the network packet and the transition byte is associated with a subnet of the corresponding internet protocol address (iii) apply the determined bitmask to the n-tuple of the network packet to generate a masked n-tuple, (iv) generate a hash of the masked n-tuple, and (v) compare the generated hash to a reference hash associated with the access control rule to identify a match; and
  a rule execution module to perform an access control action in response to identification of a match between the generated hash and the reference hash.

2. The computing device of claim 1, wherein to determine the bitmask comprises to determine a byte-level bitmask.

3. The computing device of claim 1, wherein to generate the hash comprises to generate a cyclic redundancy check (CRC) hash of the masked n-tuple.

4. The computing device of claim 1, wherein the access control module is further to:
  determine whether multiple access control rules correspond with the determined bitmask;
  identify a rule group based on the determined bitmask, wherein the rule group consists of access control rules that correspond with the determined bitmask; and
  compare the generated hash to one or more references hashes of the rule group to identify a match.

5. The computing device of claim 4, wherein to compare the generated hash to the one or more reference hashes comprises to iterate through each access control rule of the rule group to identify a match.

6. The computing device of claim 4, wherein to compare the generated hash to the one or more reference hashes comprises to identify a rule subgroup of the rule group for comparison based on the generated hash and an ascending order of reference hashes in the rule group.

7. The computing device of claim 1, wherein to perform the access control action comprises to identify the access control rule for a deterministic comparison in response to identification of a match between the generated hash and the reference hash.

8. The computing device of claim 1, wherein to identify the n-tuple comprises to identify a 5-tuple consisting of a source internet protocol address field, a destination internet protocol address field, a source port field, a destination port field, and a protocol field.

9. The computing device of claim 1, wherein to parse the network packet comprises to parse a network packet received from a virtual machine switch.

10. The computing device of claim 1, wherein to parse the network packet comprises to parse a network packet received from a remote computing device communicatively coupled to the computing device.

11. The computing device of claim 1, wherein the access control module is further to determine a plurality of access control rules corresponding with a virtual machine of the computing device that received the network packet.

12. The computing device of claim 1, wherein to determine the bitmask, apply the determined bitmask, generate the hash, and compare the generated hash comprises to determine a bitmask, apply a determined bitmask, generate a hash, and compare the generated hash for a plurality of access control rules in parallel.

13. One or more machine-readable storage media comprising a plurality of instructions stored thereon that, in response to execution by a computing device, cause the computing device to:
  parse a network packet received by the computing device to identify an n-tuple of a header of the network packet, wherein the n-tuple is associated with one or more access control rules;
  determine a bitmask associated with an access control rule of a virtual machine of the computing device from the one or more access control rules, wherein the bitmask comprises a bit-level bitmask of a transition byte of at least one of a source internet protocol address field or the destination internet protocol address field of the header of the network packet and the transition byte is associated with a subnet of the corresponding internet protocol address;

apply the determined bitmask to the n-tuple of the network packet to generate a masked n-tuple;

generate a hash of the masked n-tuple;

compare the generated hash to a reference hash associated with the access control rule to identify a match; and perform an access control action in response to identifying a match between the generated hash and the reference hash.

14. The one or more machine-readable storage media of claim 13, wherein to determine the bitmask comprises to determine a byte-level bitmask.

15. The one or more machine-readable storage media of claim 13, wherein the plurality of instructions further cause the computing device to:

determine whether multiple access control rules correspond with the determined bitmask;

identify a rule group based on the determined bitmask, wherein the rule group consists of access control rules that correspond with the determined bitmask; and compare the generated hash to one or more references hashes of the rule group to identify a match.

16. The one or more machine-readable storage media of claim 15, wherein to compare the generated hash to the one or more reference hashes comprises to identify a rule subgroup of the rule group for comparison based on the generated hash and an ascending order of reference hashes in the rule group.

17. The one or more machine-readable storage media of claim 13, wherein to perform the access control action comprises to identify the access control rule for a deterministic comparison in response to identifying a match between the generated hash and the reference hash.

18. A method for performing access control by a computing device, the method comprising:

parsing, by the computing device, a network packet received by the computing device to identify an n-tuple of a header of the network packet, wherein the n-tuple is associated with one or more access control rules;

determining, by the computing device, a bitmask associated with an access control rule of a virtual machine of the computing device from the one or more access control rules, wherein the bitmask comprises a bit-level bitmask of a transition byte of at least one of a source internet protocol address field or the destination internet protocol address field of the header of the network packet and the transition byte is associated with a subnet of the corresponding internet protocol address;

applying, by the computing device, the determined bitmask to the n-tuple of the network packet to generate a masked n-tuple;

generating, by the computing device, a hash of the masked n-tuple;

comparing, by the computing device, the generated hash to a reference hash associated with the access control rule to identify a match; and performing, by the computing device, an access control action in response to identifying a match between the generated hash and the reference hash.

19. The method of claim 18, further comprising:

determining, by the computing device, whether multiple access control rules correspond with the determined bitmask;

identifying, by the computing device, a rule group based on the determined bitmask, wherein the rule group consists of access control rules that correspond with the determined bitmask; and comparing, by the computing device, the generated hash to one or more references hashes of the rule group to identify a match.

* * * * *